US006782096B1

(12) United States Patent
Bremer et al.

(10) Patent No.: US 6,782,096 B1
(45) Date of Patent: Aug. 24, 2004

(54) SUBSCRIBER LINE DRIVER AND TERMINATION

(75) Inventors: Gordon Bremer, Clearwater, FL (US); Chuck Coston, Seminole, FL (US); Ed Thoenes, Largo, FL (US); William L. Betts, St. Petersburg, FL (US); Thomas J. Bingel, Belleair Beach, FL (US); Rafael Martinez, Clearwater, FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/439,933

(22) Filed: Nov. 12, 1999

Related U.S. Application Data (60) Provisional application No. 60/108,044, filed on Nov. 12, 1998.

(51) Int. Cl.[7] ............................................. H04M 1/00
(52) U.S. Cl. .................. 379/399.01; 379/400; 379/401; 379/404; 379/398; 379/1.03; 375/229; 375/230
(58) Field of Search .......................... 379/399.01, 413, 379/413.02, 414, 413.04, 400, 401, 403, 404, 418, 398, 394; 375/222, 229, 230, 233, 254, 268, 288, 287, 297, 300, 358

(56) References Cited

U.S. PATENT DOCUMENTS

| 4,964,116 A | * | 10/1990 | Measor ........................ 379/394 |
| 5,008,903 A | | 4/1991 | Betts et al. .................... 375/60 |
| 5,402,444 A | * | 3/1995 | Saito .......................... 375/229 |
| 5,832,387 A | * | 11/1998 | Bae et al. .................... 455/522 |
| 5,999,619 A | * | 12/1999 | Bingel ......................... 379/394 |
| 6,061,427 A | * | 5/2000 | Ryoo ............................. 379/1 |
| 6,078,613 A | * | 6/2000 | Bingel ......................... 375/220 |
| 6,185,251 B1 | * | 2/2001 | Fertner ........................ 375/231 |
| 6,226,356 B1 | * | 5/2001 | Brown ...................... 379/27.01 |
| 6,263,015 B1 | * | 7/2001 | Awata et al. ................. 375/216 |

* cited by examiner

Primary Examiner—Rexford Barnie
(74) Attorney, Agent, or Firm—Thomas, Kayden, Horstemeyer & Risley, L.L.P.

(57) ABSTRACT

A subscriber line driver (SLD) is provided for the continuous and automatic transformation of the characteristics of a communication system signal so that the signal conforms to a power spectral distribution (PSD) standard. The signal is transformed by the SLD which may increase (amplify) portions of the signal to a predefined specification, decrease (attenuate) portions of the signal to a predefined specification, and/or frequency modulate or filter the transmit signal frequencies to fit within the communication channel frequency bandwidth as defined by a predefined frequency band. After modification by the SLD, the transformed communication signal is injected (transmitted) into a communication transmission line. An SLD device can be employed in a variety of communication systems such as a public telephony system, a private branch exchange (PBX), a coaxial cable system, a fiber optic system, a microwave system, a radio communication system or the like. In the preferred embodiment, the SLD device operates in connection with a telephony system local loop which is operated as a digital subscriber loop (DSL). The SLD has an infinite input impedance at all frequencies. Addition of a parallel resister can enable the design engineer to set the transmission system terminating impedance to any desired value. This SLD can also be implemented in connection with a telephony system central office (CO) or a PBX.

34 Claims, 9 Drawing Sheets

SUBSCRIBER LINE DRIVER AND TERMINATION

CLAIM OF PRIORITY

This document claims priority to and the benefit of the filing date of commonly assigned Provisional Application entitled, "SUBSCRIBER LINE DRIVER AND TERMINATION," filed Nov. 12, 1998, now abandoned and accorded Serial No. 60/108,044. The foregoing pending provisional application is hereby incorporated herein by reference in its entirety.

FIELD OF THE INVENTION

The present invention relates generally to the art of data communications. The preferred embodiment generally relates to the art of telephony, and more particularly, to a communication signal driver system (and associated methodology) for connection between a telephony switching unit, which may be located at a central office (CO), at a private branch exchange (PBX) or the like, and customer premises equipment via an existing telephony connection (e.g., copper wire twisted-pair, digital subscriber loop or the like).

BACKGROUND OF THE INVENTION

With the increasing bandwidth demands from the advent of the Internet, service providers have looked for ways to increase data performance over the copper wire twisted-pair local loop transmission lines that connect the telephone central offices (COs) to the customer premises (CPs). The customer premises equipment (CPE) is connected to the CO switches over transmission lines known as "local loops," "subscriber loops," "loops," or the "last mile" of the telephone network. Historically, the public switched telephone network (PSTN) evolved with subscriber loops connected to a telephone network with circuit-switched capabilities that were designed to carry analog voice communications. Digital service provision to the customer premises is a more recent development, with the evolution of the telephone network from a system just designed to carry analog voice communications into a system which could simultaneously carry voice and digital data.

Because of the prohibitive costs of replacing or supplementing existing subscriber loops, technologies have been implemented that utilize existing subscriber loops to provide easy and low cost customer migration to digital technologies. Subscriber loops capable of carrying digital channels are known as digital subscriber lines (DSLs). Logical channels within a subscriber line which carry digital signals are known as DSL channels, while logical channels within a subscriber line which carry plain old telephone service (POTS) analog signals are known as POTS channels. Furthermore, to provide customers with additional flexibility and enhanced services, frequency-division multiplexing and/or time-division multiplexing techniques have been designed to fill a subscriber loop with multiple logical channels. These newer DSL technologies provide digital service to the customer premises without significantly interfering with the existing POTS equipment and wiring. The newer DSL technologies accomplish this functionality by frequency-division multiplexing (FDM) their digital signal above (at higher frequencies than) the 0 KHz to 4 KHz baseband of standard, analog POTS signals. Multiplexing techniques and terminology are common to those skilled in the art, and are not described herein.

Several variants of new DSL technology exist (e.g., ADSL, SDSL, RADSL, VADSL, MVL™, Tripleplay™, etc.), with this group generally referred to as xDSL. Communications systems carrying xDSL usually multiplex xDSL signals and a POTS signal onto a single physical local loop.

Historically, the POTS subscriber loop was designed with the functions needed to communicate both analog, voice-conversation signals and subscriber loop signaling. The CO switch uses subscriber loop signaling to notify the customer premises about events in the telephone network, while customer premises equipment (CPE) use subscriber loop signaling to inform the CO to perform actions for the customer. Some examples of subscriber loop signaling include: the CO switch signaling to the CPE that an incoming call has arrived by ringing the phone, the CPE (e.g., a telephone) signaling to the CO switch that the CPE is initiating a call by an on-hook to off-hook transition of the telephone handset, and the CPE signaling to the CO switch that a call should be connected to a location by sending the phone number of the location.

Although the transmission of both digital and analog POTS signals over a subscriber loop offers many potential advantages for customers, several practical problems must be solved in implementing DSL solutions. One significant problem resulting from the POTS subscriber loop signaling functions is the generation of high-frequency interference, known in the art as noise, into DSL channels. For instance, the on-hook/off-hook signal and the pulse-dialing signal are square waveforms which have high-frequency components and harmonics, and theoretically require infinite frequency bandwidth. This high-frequency noise may degrade the signal to noise (S/N) ratio of the DSL channel. The S/N ratio is commonly known to those skilled in the art, but can be simply described as the ratio of the transmit signal amplitude to the noise amplitude, expressed in decibels (dB). Thus, a heretofore unaddressed need exists in the industry for a way to prevent or substantially minimize the adverse affects on the DSL channel S/N ratio caused by noise introduced by the POTS subscriber loop functions.

Another practical problem facing the industry effort to implement DSL technology on the existing PSTN system is the large voltage magnitude change occurring on the subscriber loop during transitions between on hook and off hook conditions, as is well known in the art. Some embodiments of prior art DSL technology require a change in the input impedance of the DSL device upon sensing of a transition between on-hook and off-hook conditions. Thus, a heretofore unaddressed need exists in the industry for a way to prevent or substantially minimize the adverse affects of the on-hook/off-hook transition.

Another practical problem facing the industry effort to implement DSL technology on the existing PSTN system is the unpredictable nature of the subscriber loop transmission system impedance. Signal attenuation (decrease in signal strength) and signal distortion (changes in the signal shape) are caused by real and reactive impedance losses incurred on the subscriber loop as the signal is transmitted between the CO and the CPE. Each subscriber loop, consisting of a copper wire twisted-pair circuit connecting the CO to the CPE, is unique. That is, each subscriber loop differs in length, and often these subscriber loops are constructed with varying copper wire gauge sizes. Therefore, the actual circuit impedance of any given subscriber loop is unique and different from other subscriber loops. DSL technology utilizes FDM to shift the frequency of the communication signal into the 25 KHz to 1 MHz frequency range. As is well known in the art, subscriber loop circuit impedance is not a constant, but rather a variable over the frequency spectrum because the subscriber loop impedance is complex (having reactive impedance components as well as resistive impedance components). Therefore, signal attenuation also varies with the frequency of a transmission signal. That is, some frequencies will be attenuated more or less than other frequencies.

The presence of bridged taps connected to the subscriber loop introduces another unpredictable impedance component. Bridged taps are unused copper wire twisted-pair lengths connected at various points of the subscriber loop. Bridged taps constitute parallel circuits which alter the impedance of the subscriber loop circuit, and effectively reduce the transmit signal strength.

Finally, the wiring of the customer premise and the various types of customer equipment and devices, including multipoint communication, connected to the subscriber loop is unique. These differences at the customer premise also impact the overall impedance of the subscriber loop transmission system.

For the purpose of establishing the transmitter frequency domain specifications and limits, current practice typically models the subscriber loop impedance as a resister, $R_L$, that is representative of the characteristic impedance of the subscriber loop transmission line. At the remote end of the transmission line, the receiver equipment is typically modeled as a terminating resister, $R_R$, usually of the same value as $R_L$. Transmission of signals onto subscriber loops has been provided by a voltage signal source, $V_S$, and a series resister, $R_T$. Current practice is to transmit at the subscriber loop transmission line input a transmit signal spectral shape of $V_S$ that is designed to be same as a voltage power spectral distribution (PSD) standard. The PSD standard specifies maximum signal strength (amplitude) and frequency bandwidth boundaries for a DSL channel.

Design of the transmit signal spectral shape of $V_S$ necessarily requires certain assumptions about the subscriber loop transmission system. Traditional transmission line theory teaches that for optimum communication, the subscriber loop transmission system should have $R_T = R_L = R_R$. As an example, it is customary in some DSL technologies to select $R_L = 135$ ohms for transmission signals in the band from approximately DC to 192 kHz. This 135 ohm value is a reasonable best choice for a simplistic resistive compromise model. Because the prior art model is resistive, the design transmit signal is the same as the design PSD of $V_S$.

However, the prior art assumptions may be wholly inadequate in representing the wide range of subscriber loop transmission lines found in practice. $R_T$ is not ideal ($R_T \neq R_L \neq R_R$) since each individual subscriber loop is unique. Also, $R_L$ is not ideal because customer premises wiring are often different and because of bridged taps on the subscriber loop. In practice, the actual subscriber loop transmission system impedance can vary in magnitude from well over 200 ohms to less than 50 ohms, and the actual impedance is complex. The result in practice is that the actual transmit signal on any given transmission line can vary dramatically, and this variance is usually such that the transmit signal amplitude is lower than permitted in part of or all of the transmission band as defined by the PSD standard. It can be shown, for example, that the actual transmit signal amplitude can be 12 dB lower than the PSD standard in part of the band, and even average power can be 6 dB lower than allowed. This means that 6 dB or more of potential transmit signal power is being sacrificed, and that the receive signal S/N ratio is thus 6 dB lower than the S/N that could be realized with an optimized transmit signal.

Another problem involves instances where the actual transmit signal voltage exceeds the PSD standard. If the actual transmit signal voltage exceeds the PSD standard, undesirable interference or noise is induced onto other subscriber loops sharing the same underground cable or overhead wire.

Thus, a heretofore unaddressed need exists in the industry for a way to provide for a transmit signal which conforms to a defined PSD standard regardless of the actual impedance characteristics of the transmission system.

SUMMARY OF THE INVENTION

The present invention provides a subscriber line driver (SLD) for transforming the characteristics of a communication system signal. The signal is transformed by the SLD which increases (amplifies) portions of the signal to a predefined specification, decreases (attenuates) portions of the signal to a predefined specification, and/or frequency modulates or filters the transmit signal frequencies to fit within the communication channel frequency bandwidth as defined by the frequency band of the predefined specification. After modification by the SLD, the transformed communication signal is injected (transmitted) into a communication transmission line. The SLD may operate in a continuous and automatic mode. An SLD may be applicable to a variety of communication systems, for example but not limited to, a public telephony system, a private branch exchange (PBXs), a coaxial cable system, a fiber optic system, a microwave system or a radio communication system. In the preferred embodiment, the SLD operates on a telephony system subscriber loop which is operated as a digital subscriber loop (DSL) having a plain old telephone system (POTS) channel and at least one DSL channel.

The method of the preferred embodiment of the SLD comprises the following steps. The direction of travel of a communication signal is sensed when in the transmit signal direction, where the transmit direction is defined as traveling in a direction out to the communication system, here a subscriber loop. The SLD transforms the communication signal traveling in the transmit direction such that the transformed communication signal conforms to a predefined specification.

The preferred embodiment of the SLD comprises at least two functional components, a transmit signal equalizer and a current driver connected to the output of the transmit signal equalizer. In the preferred embodiment, the current driver injects (transmits) the transformed communication signal into the subscriber loop. Another embodiment of the SLD utilizes a voltage driver (rather than the current driver). A voltage feedback loop can be added to the SLD circuitry which further optimizes the transformed communication signal.

The SLD has an infinite input impedance at all frequencies. Addition of a parallel resister connected to a tip wire and a ring wire of the telephony system can enable the design engineer to set the transmission system terminating impedance to any desired value.

Another embodiment of the SLD modifies the transmit signal to conform to a first predefined specification, and also modifies the receive signal to conform to a second predefined specification. This embodiment of the SLD may have any of the methods, features and options of the SLD embodiments previously described.

This invention also provides for a telephony system central office (CO), comprising at least one telephony switching unit, at least one digital equipment unit and at least one subscriber line driver (SLD). The telephony switching unit is ultimately connected to a telephony transmission system on one side and to at least one telephony subscriber loop or DSL on the other side. At least one subscriber line driver (SLD) would be connected between one terminal of the digital equipment unit and one subscriber loop or DSL. The SLD would receive a communication signal from the digital equipment unit, and would transform the communication signal into a transformed communication signal so that the transformed communication signal conforms to a predefined specification.

This invention also provides for a private branch exchange (PBX), comprising at least one telephony switching unit, at least one digital equipment unit and at least one subscriber line driver (SLD). The telephony switching unit is ultimately connected to a telephony transmission system on one side and to at least one of telephony subscriber loop or DSL on the other side. At least one SLD would be connected between one terminal of the digital equipment unit and one subscriber loop or DSL. The SLD would receive a communication signal from the digital equipment unit, and would transform the communication signal into a transformed communication signal so that the transformed communication signal conforms to a predefined specification.

Other features and advantages of the present invention will become apparent to one skilled in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the present invention. Furthermore, like reference numerals designate corresponding parts throughout the several views.

DETAILED DESCRIPTION

Figure 1:
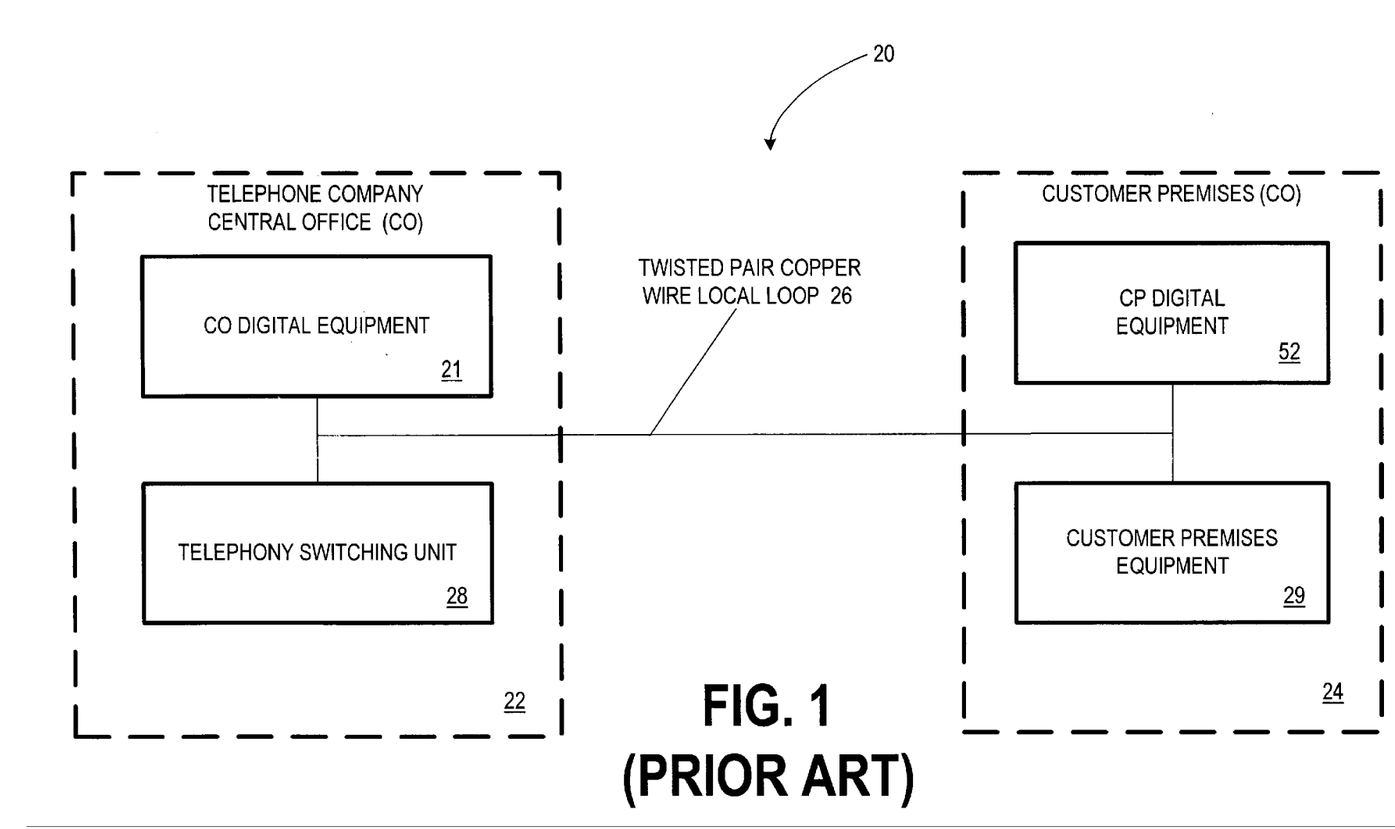
FIG. 1 is a block diagram of an existing telephony system of the prior art.

FIG. 1 is a block diagram illustrating an existing telephony system 20 which includes a telephone company central office (CO) 22 connected to a customer premises (CP) 24 via a subscriber loop 26. The subscriber loop 26 may be any suitable connection for passing electrical signals, but is typically a copper wire twisted-pair, as is well known in the art, that was originally designed to carry a 0–4 KHz analog voice channel. Located within the CO 22 is the CO telephony switching unit 28 which transmits communication signals received from the outside world to the CP 24 via the subscriber loop 26, or which receives communication signals from the customer premises equipment (CPE) 29 via the subscriber loop 26 for transmission to designated locations in the outside world. In the context of this disclosure describing the existing telephony system, "outside world" means any telephone or communications device connected to or having access to the global telephone network, the public switched telephone network (PSTN) and/or a private telephony system, and where designated locations in the outside world are identified by telephone numbers or some other identification manner commonly employed by the art. CO digital equipment 21 and CP digital equipment 52 may be added at the central office and the customer premises to facilitate transmission of digital data. When the copper wire twisted-pair is used for digital transmission, the twisted-pair is often referred to as a digital subscriber loop (DSL). "Central office" or "CO" means any site where a subscriber loop 26 connects into a telephony switching unit, such as a public switched telephone network (PSTN), a private branch exchange (PBX) telephony system, or any other location functionally connecting subscriber loops to a telephony network.

Figure 2:
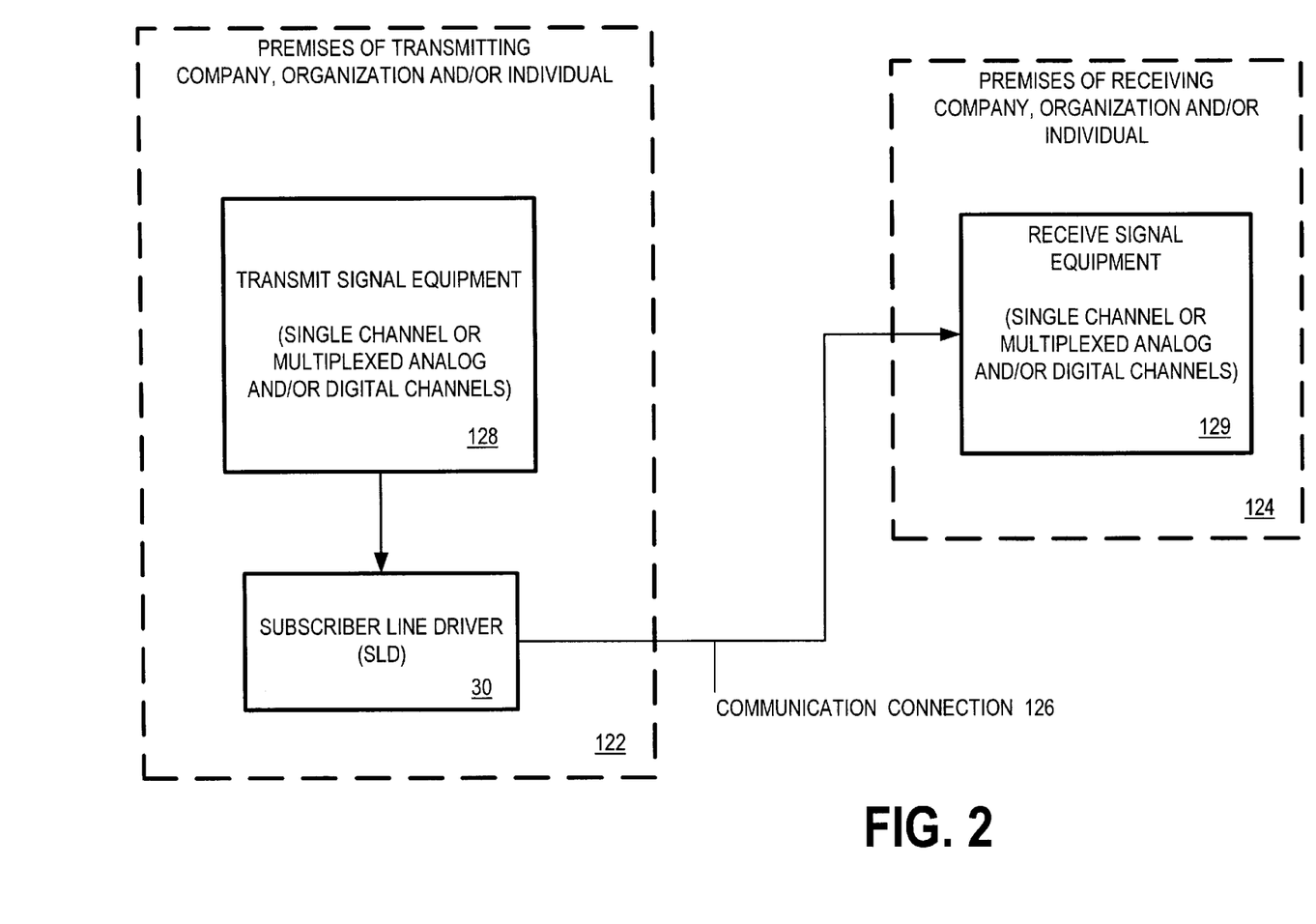
FIG. 2 is a block diagram of an SLD of an embodiment of the present invention located on the premises of a transmitting company, organization, and/or individual.

FIG. 2 is a block diagram illustrating the relative location of the preferred embodiment of the subscriber line driver (SLD) at the transmit signal site. The preferred embodiment of the SLD continuously and automatically modifies a non-ideal communication signal amplitude spectra 238, which will be further described in detail hereinafter in FIG. 3A through FIG. 3E, received from the transmit signal equipment 128, to fit within the frequency bandwidth and within the maximum amplitude of the PSD standard 40 (FIG. 3A) prior to injecting (transmitting) the transformed communication signal into the communication connection 126. The communication signal is then delivered to the receive signal equipment 129.

The method of the preferred embodiment of the SLD comprises the following steps. The direction of travel of a communication signal is sensed when in the transmit signal direction, where the transmit direction is defined as traveling in a direction out to the subscriber loop. The SLD transforms the communication signal traveling in the transmit direction such that the transformed communication signal conforms to a predefined specification or a predefined difference threshold. This method is described in detail hereinafter.

Figure 3A:
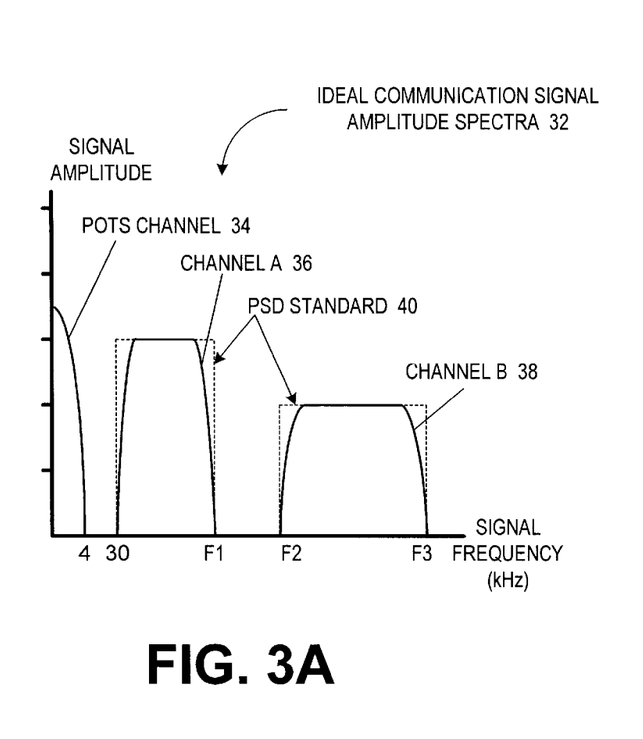
FIG. 3A is a graph illustrating ideal transmit signal amplitude spectra for a POTS channel and two DSL channels.

FIG. 3A illustrates examples of an ideal communication signal amplitude spectra 32 consisting of three communication signals multiplexed into three separate channels. The three signals would be transmitted into, or injected into, a communications system, for example but not limited to, a DSL subscriber loop. The vertical axis of the spectra is the signal strength or amplitude measured in dB, where dB is commonly known in the art as decibels (dB). The horizontal axis of the spectra is signal frequency measured in Hertz (Hz). The same axis definitions will apply to FIG. 3B through FIG. 3E.

In FIG. 3A, the analog voice communication signal occupies the plain old telephone system (POTS) channel 34. As is well known in the art, the POTS channel typically occupies a bandwidth from about 0 to 4 KHz. Two additional channels may be used in the DSL industry to transmit digital data. In this embodiment of the DSL system, channel A 36 occupies a bandwidth of 30 KHz to F1 KHz, and channel B 38 occupies a bandwidth of F2 KHz to F3 KHz. Channel A 36 and channel B 38 each contain an ideal communication signal of a two channel DSL system. The communication signals may be comprised of either analog or digital data. F1, F2 and F3 are communication bandwidth frequency boundaries of a PSD standard 40 selected by the system design engineer. The 30 KHz lower frequency of the channel A 36 bandwidth is a typical value encountered in the art, but which may be adjusted to a different value by the system design engineer.

Shown in FIG. 3A with a dashed line is the power spectral distribution (PSD) standard 40 for a channel A and channel B. A PSD standard 40 defines the allowable PSD frequency range (bandwidth) and the maximum signal strength (amplitude) for a communication channel at the sending (transmitting) location. If the transmitted communication signal amplitude exceeds the PSD standard 40, then undesirable interference or noise could be induced onto other subscriber loops sharing the same underground cable or overhead wire. If a transmitted communication signal amplitude is less that the PSD standard 40, the transmitted communication signal is under-powered resulting in a less than optimal S/N ratio. If the bandwidth of a transmitted communication signal lies outside of the frequency boundaries of the PSD standard 40, then the transmitted communication signal may overlap onto and interfere with other communication channels. The transmitted communication signals of channel A 36 and channel B 38 as shown in FIG. 3A are nearly ideal. That is, the two transmitted communication signals occupy the greatest region of the PSD 40 standard without exceeding the amplitude and bandwidth limits as defined by the PSD standard 40.

Often, on a prior art two channel DSL system, a communication signal in one channel is traveling in the opposite direction of a communication signal in the other channel. Direction of signal travel depends upon the application of the DSL system user. As an illustrative example, the communication signal of channel A 36 could be transmitted at the CO digital equipment 21 (FIG. 1) into the subscriber loop 26 for transmission to the CP digital equipment 52. Similarly, the communication signal of channel B 38 could be transmitted at the CP digital equipment 52 into the subscriber loop 26 for transmission to the CO digital equipment 21. (For the remainder of the disclosure of the preferred embodiment, for illustrative purposes only, the communication signal transmission location of channel A 36 will be designated as the CO 22 and the communication signal transmission location of channel B 38 will be designated as the CP 24.) In actual practice of the prior art, signals may be transmitted from or received by both the CO digital equipment 21 and the CP digital equipment 52.

Often, signal transmission direction in a channel changes direction regularly, as in the POTS channel. For example, during a telephone voice conversation between two people over the PSTN, the speaker determines the transmission location of the communication signal and the listener determines the location of the received signal. As a conversation proceeds between the two people, the direction of travel of the communication signal regularly changes depending upon which party is doing the talking. Direction of travel of the communication signals of a DSL system can also be regularly changing.

Figure 3B:
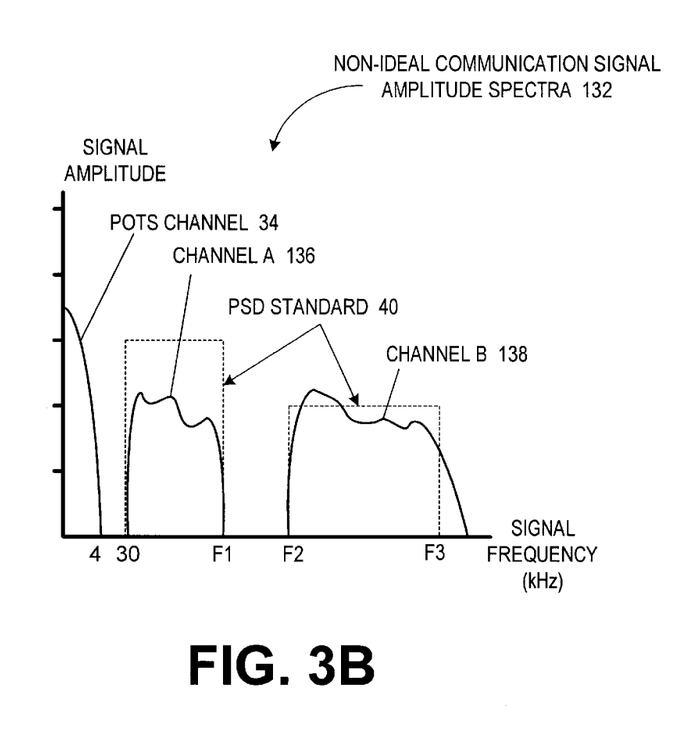
FIG. 3B is a graph illustrating non-ideal transmit signal amplitude spectra for a POTS channel and two DSL channels.

FIG. 3B is illustrative of non-ideal communication signal amplitude spectra 132 which may be encountered with the prior art DSL technologies. The transmitted communication signal 136 of channel A is illustrated in FIG. 3B as degraded below the maximum signal strength allowed by the PSD standard 40 due to effects of the actual impedance of the subscriber loop, the presence of bridged taps, wiring of the customer premises, and/or the various types of customer equipment as previously described in the Background section of this disclosure. For further illustrative purposes, a part of the communication signal channel B 138 has been degraded below the maximum signal strength allowed by the PSD standard 40, while part of the communication signal channel B 138 exceeds the maximum signal amplitude allowed by the PSD standard 40. Also, the higher frequencies of communication signal channel B 138 are greater than the high frequency (F3) bandwidth limit of the PSD standard 40 due to the reactive components of the transmission system.

Figure 3C:
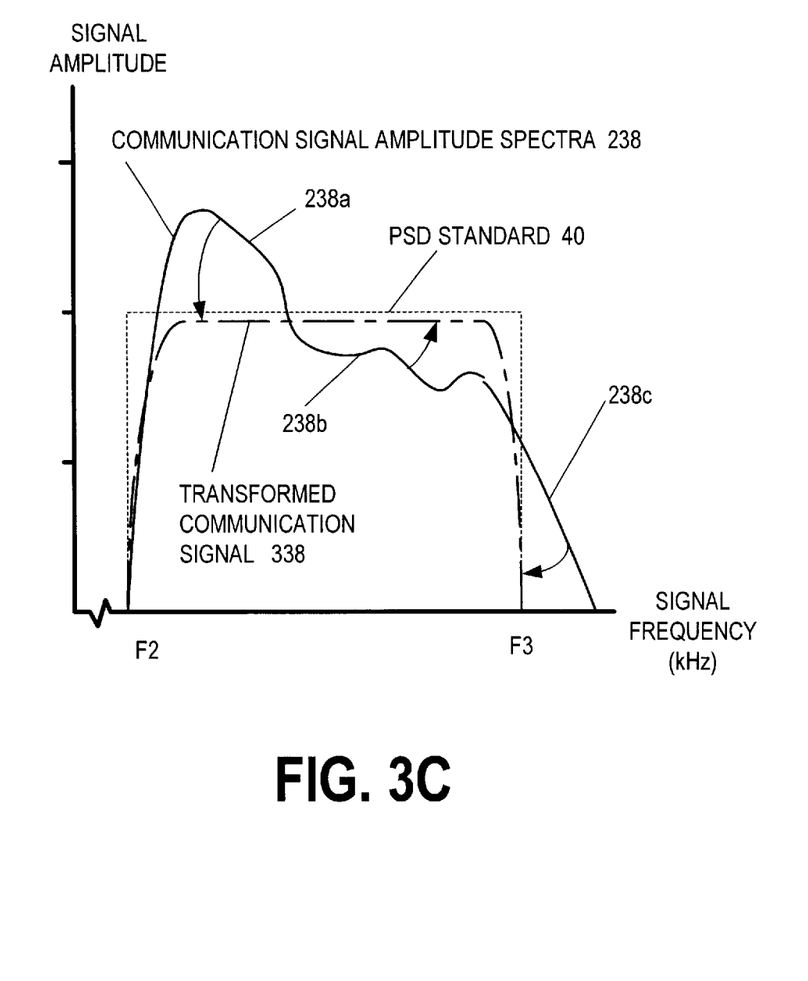
FIG. 3C is a graph illustrating the modification of a non-ideal transmit signal by the preferred embodiment of the SLD of FIG. 2.

FIG. 3C is an enlarged view illustrating the non-ideal communication signal amplitude spectra 238 of channel B (FIG. 3B) before processing by the SLD. Transmitting this non-ideal communication signal amplitude spectra 238 into a subscriber loop will cause a variety of problems, as previously discussed in the Background section. The preferred embodiment of the SLD 30 senses the direction of travel of a communication signal and selects the signal if traveling in the transmitting direction, defined as traveling in a direction out to the subscriber loop. Once a communication signal has been selected, the SLD 30 would continuously and automatically amplify a digital signal to transform the communication signal into a transformed communication signal such that the transformed communication signal conforms to a predefined specification. This specification would not be greater than the maximum amplitude allowed by the PSD standard 40. Here, in this illustrative example, the lower frequency portion 238a of the non-ideal communication signal amplitude spectra 238 exceeds the maximum amplitude of the PSD standard 40. If the communication signal portion 238a is injected (transmitted) into the subscriber loop, undesirable interference could be induced in adjacent subscriber loops, as previously described in the Background section. That portion of the communication signal 238a would be reduced (attenuated) by the preferred embodiment of the SLD 30 to an amplitude value in close proximity to the maximum amplitude of the PSD standard 40, as shown by the transformed communication signal 338. Here, close proximity can be defined as the amplitude of the transformed communication signal 338 being below, at, or above the PSD standard 40, or another predefined standard, such that the error (difference) between the PSD standard 40 and the transformed communication signal 338 is within some predefined difference threshold.

Here, in the illustrative example of FIG. 3C, the mid-range portion 238b of the non-ideal communication signal amplitude spectra 238 is less than the maximum amplitude of the PSD standard 40. If the communication signal portion 238b is transmitted into the subscriber loop, the S/N ratio will not be maximized, as previously discussed in the Background section. The mid-range portion 238b of the non-ideal communication signal amplitude spectra 238, which is below the maximum amplitude of the PSD standard 40, would be increased (amplified) by the preferred embodiment of the SLD 30 to a value in close proximity to the maximum amplitude of the PSD standard 40, as shown by the transformed communication signal 338.

Another embodiment of the SLD 30 may have the additional feature of providing for frequency modulation, frequency shifting, or filtering a non-ideal communication signal to conform the transformed communication signal to a predefined frequency band specification that is within the frequency bandwidth limits specified by the PSD standard 40. As shown in the illustrative example of FIG. 3C, the highest frequency portion 238c of the non-ideal communication signal amplitude spectra 238 exceeds the high frequency limit F3 of the PSD standard 40. If the communication signal portion 238c is transmitted into the subscriber loop, undesirable interference could be induced in adjacent DSL channels, as previously described in the Background section. This embodiment of SLD 30 would frequency shift or filter the non-ideal communication signal amplitude spectra 238 to fit within the frequency boundaries of the PSD standard 40, as shown by the transformed communication signal 338.

Figure 3D:
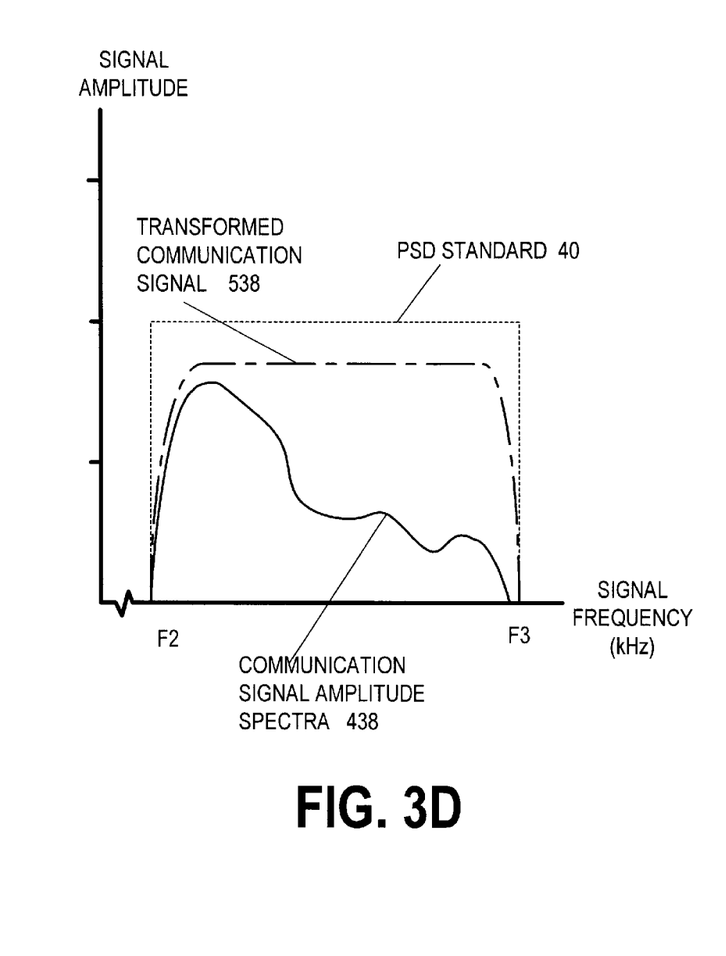
FIG. 3D is a graph illustrating the modification of a non-ideal transmit signal by another embodiment of the SLD of FIG. 2.

FIG. 3D depicts an illustrative non-ideal communication signal amplitude spectra 438 before processing of a DSL channel. Another embodiment of the SLD 30 acts upon the non-ideal communication signal amplitude spectra 438 to conform the non-ideal communication signal amplitude spectra 438 to a predefined specification which is equal to a percentage of the PSD standard 40, as shown by the transformed communication signal 538. For illustrative purposes, FIG. 3D shows the transformed communication signal 538 to be approximately 85 percent of the PSD standard 40. The SLD 30 continuously and automatically determines the amount of amplification at any specific frequency of the non-ideal communication signal amplitude spectra 438 and selects the degree of amplification necessary to conform the non-ideal communication signal amplitude spectra 438 to the predefined specification of the PSD standard 40. For example, the degree of amplification of the lower frequencies of the non-ideal communication signal 438 is seen to be about ten to fifty percent. The degree of amplification of the higher frequencies of the non-ideal communication signal 438 is seen to be as great as five hundred percent.

Figure 3E:
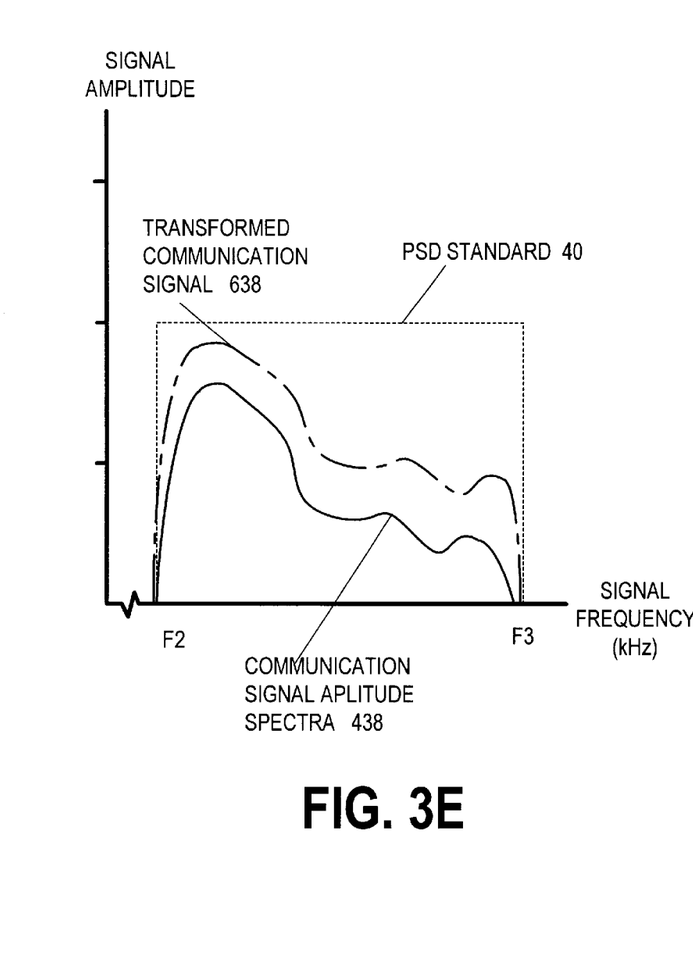
FIG. 3E is a graph illustrating the modification of a non-ideal transmit signal by another embodiment of the SLD of FIG. 2.

FIG. 3E depicts an illustrative non-ideal communication signal amplitude spectra 438 before processing by the SLD 30. Another embodiment of the SLD 30 modifies a non-ideal communication signal amplitude spectra 438 by simply amplifying the non-ideal communication signal amplitude spectra 438 by some fixed amount as determined by the predefined specification, as shown by the transformed communication signal 638. For illustrative purposes, FIG. 3E shows the fixed amount of amplification applied to the non-ideal communication signal amplitude spectra 438 to be approximately thirty percent of the non-ideal communication signal.

Figure 4:
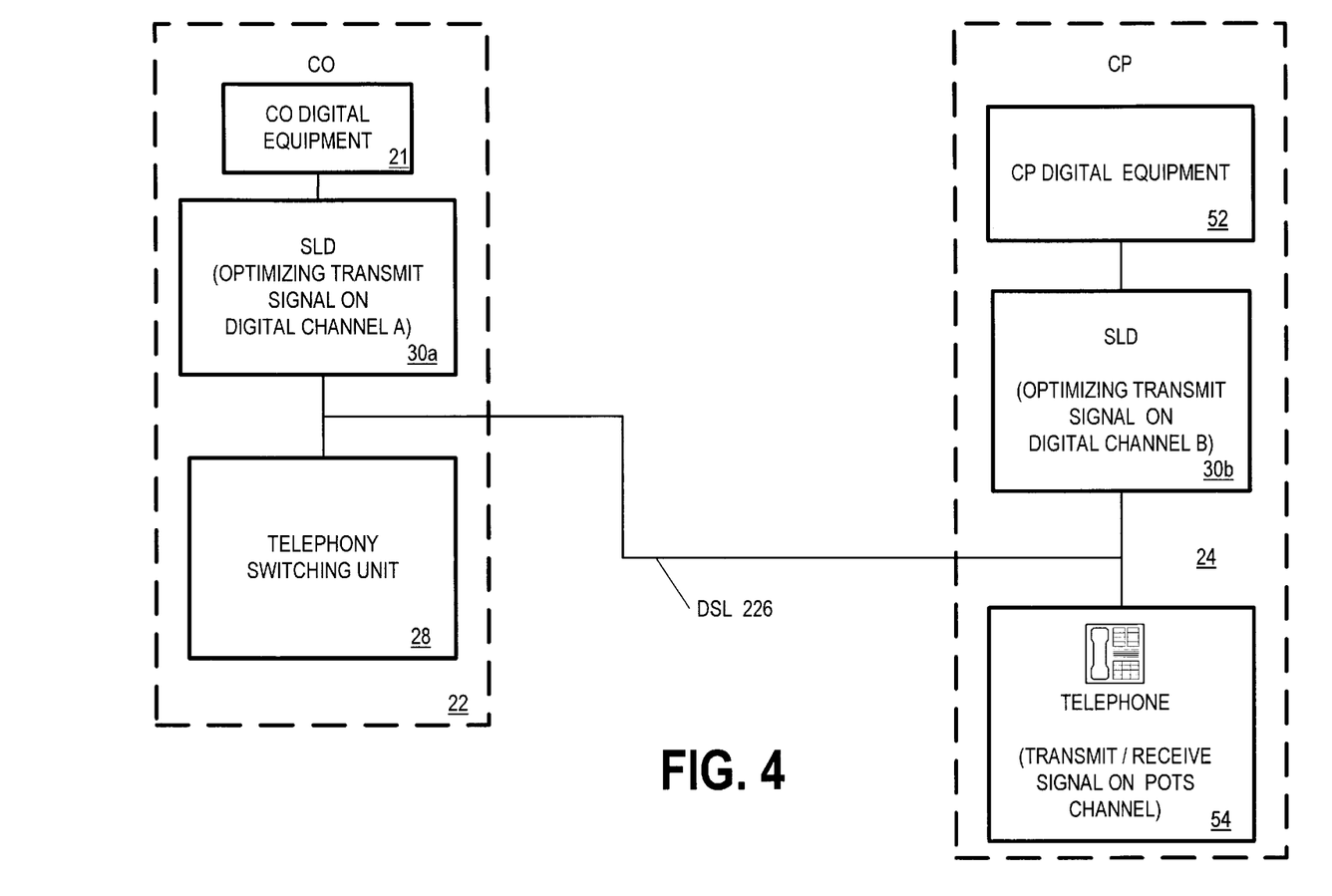
FIG. 4 is a block diagram illustrating an SLD located at the telephone company central office and an SLD located at the customer premises.

FIG. 1 shows an existing telephone central office 22 and the customer premises 24 without the SLD 30 (FIG. 2). Digital signal transmission and signal receiving equipment is depicted as the CO digital equipment 21 and the CP digital equipment 52. FIG. 4 shows a more detailed telephone system with installation of a telephony system embodiment of the SLD 30. One skilled in the art will realize that the telephone system illustrated in FIG. 4 can be replaced with other types of communication systems where transmit signal processing by the SLD would be beneficial. Other types of communication systems could include, but are not limited to, private telephony systems, coaxial cable systems, fiber optic systems, microwave systems or radio communication systems.

FIG. 4 is now described in greater detail. Three communication equipment components of the telephony system CO 22 are shown, the telephony switching unit 28, digital equipment 21 and the SLD 30a. (More communication equipment components, unrelated to the operation of the SLD 30a, would likely be located at the telephone company CO 22, but are not shown in FIG. 4.) Three communication equipment components of the customer premises 24 are shown, a telephone 54, the SLD 30b, and the CP digital equipment 52. Examples of the CP digital equipment 52 could be, but are not limited to, a computer, or a television set-top-box. For illustrative purposes for the preferred embodiment of this SLD, and as previously noted during the discussion of FIG. 3A, the communication signal transmission location of channel A 36 of the DSL system will be designated as the CO 22 and the communication signal transmission location of channel B 38 will be designated as the CP 24. One skilled in the art will realize that the transmission location of the communication signals could be at either, or both, the CO 22 or the CP 24. Also, one skilled in the art will realize that any data channel could be applicable to the illustrative example of FIG. 4 and to the application of the SLD.

When a communication signal is transmitted from the CO 22 to the CP 24 over channel A, the transmitted communication signal may not be ideal (channel A 136 of FIG. 3B). The preferred embodiment of the SLD 30a, located at the CO 22, will continuously and automatically transform (amplify, attenuate and/or frequency modulate) a communication signal from the CO digital equipment 21 to conform to a predefined specification which does not exceed the signal strength or the frequency bandwidth of the PSD standard 40 (channel A 36 of FIG. 3A). The SLD then transmits the transformed communication signal of channel A onto the DSL 226 for transmission to the CP 24. When the communication signal is received at the CP 24, then becoming the receive signal, the receive signal is delivered to the CP digital equipment 52. One skilled in the art will realize that the receive signal will pass through the SLD 30b unaffected, or entirely bypass the SLD 30b, depending upon the actual circuitry configuration of the digital signal processing equipment. That is, the preferred embodiment of the SLD will sense the direction of travel of the communication signal and selectively operate only in the communication signal transmission direction.

Similarly, when a communication signal is transmitted from the CP 24 to the CO 22 over the channel B, the communication signal may not be ideal (channel B 138 of FIG. 3B). The preferred embodiment of the SLD 30b, located at the CP 24, will transform (amplify, attenuate and/or frequency modulate) a communication signal from the CP digital equipment 52 to conform to a predefined specification which does not exceed the signal strength or the frequency bandwidth of the PSD standard 40 (channel B 38 of FIG. 3A, or channel B 338 of FIG. 3C). The SLD 30b then transmits the transformed communication signal of channel B onto the DSL 226 for transmission to the CO 22. When the communication signal is received at the CO, then becoming a receive signal, the receive signal is delivered to the CO digital equipment 21. One skilled in the art will realize that the receive signal will pass through the SLD 30a unaffected, or entirely bypass the SLD 30a, depending upon the actual circuitry configuration of the digital signal processing equipment.

As shown in FIG. 4, and which is well known by those skilled in the art, the analog telephony signal transmitted on the POTS channel 34 (FIG. 3A and 3B) between the CO telephony switching unit 28 and the telephone 54 over the DSL 226 is transmitted without interacting with the DSL, 30a or 30b, which is transmitting over channels A and B.

Figure 5A:
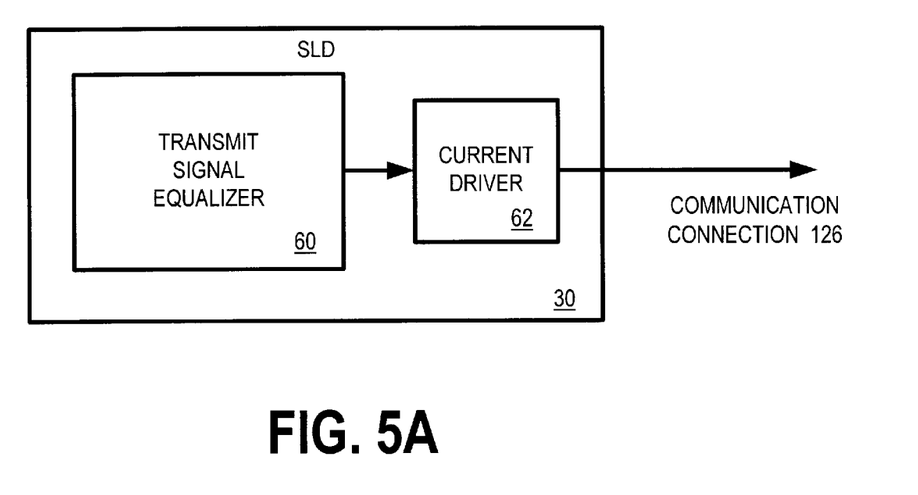
FIG. 5A is a block diagram illustrating two components of a first embodiment of the SLD of FIG. 4, a transmit signal equalizer and a current driver.
Figure 5B:
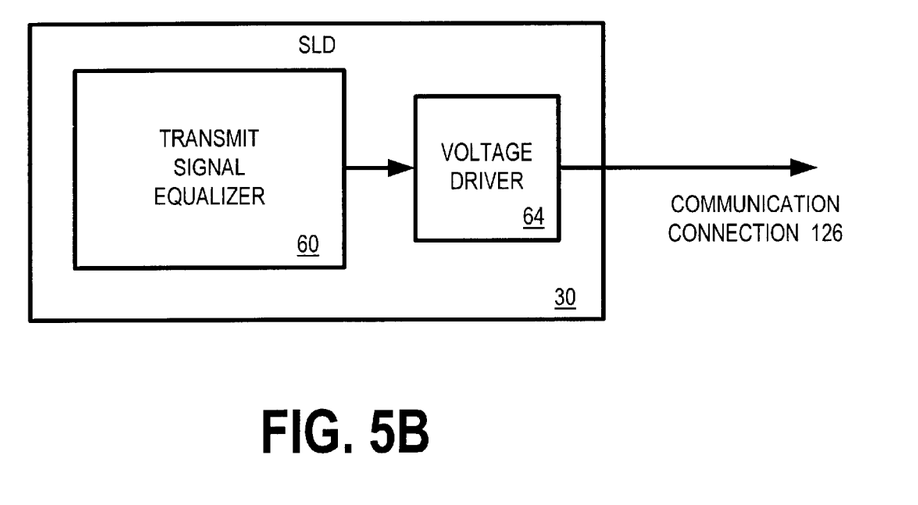
FIG. 5B is a block diagram illustrating two components of a second embodiment of the SLD of FIG. 4, a transmit signal equalizer and a voltage driver.

FIG. 5A is a block diagram showing two of the components of the preferred embodiment of the SLD 30, a transmit signal equalizer 60 and a current driver 62. The transmit signal equalizer 60 detects the incoming communication signal (not shown), and transforms (amplify, attenuate and/or frequency shift) the communication signal to conform to a predefined specification. The current driver 62 then transmits the transformed communication signal into the communication connection 126. One skilled in the art will recognize that the degree of communication signal distortion and the amount of amplification and frequency modulation required to transform the communication signal will dictate the complexity of the transmit signal equalizer 60. FIG. 5B is a variation of the SLD 30 wherein a voltage driver 64 is used to inject the transformed communication signal into the communication connection 126.

Figure 6:
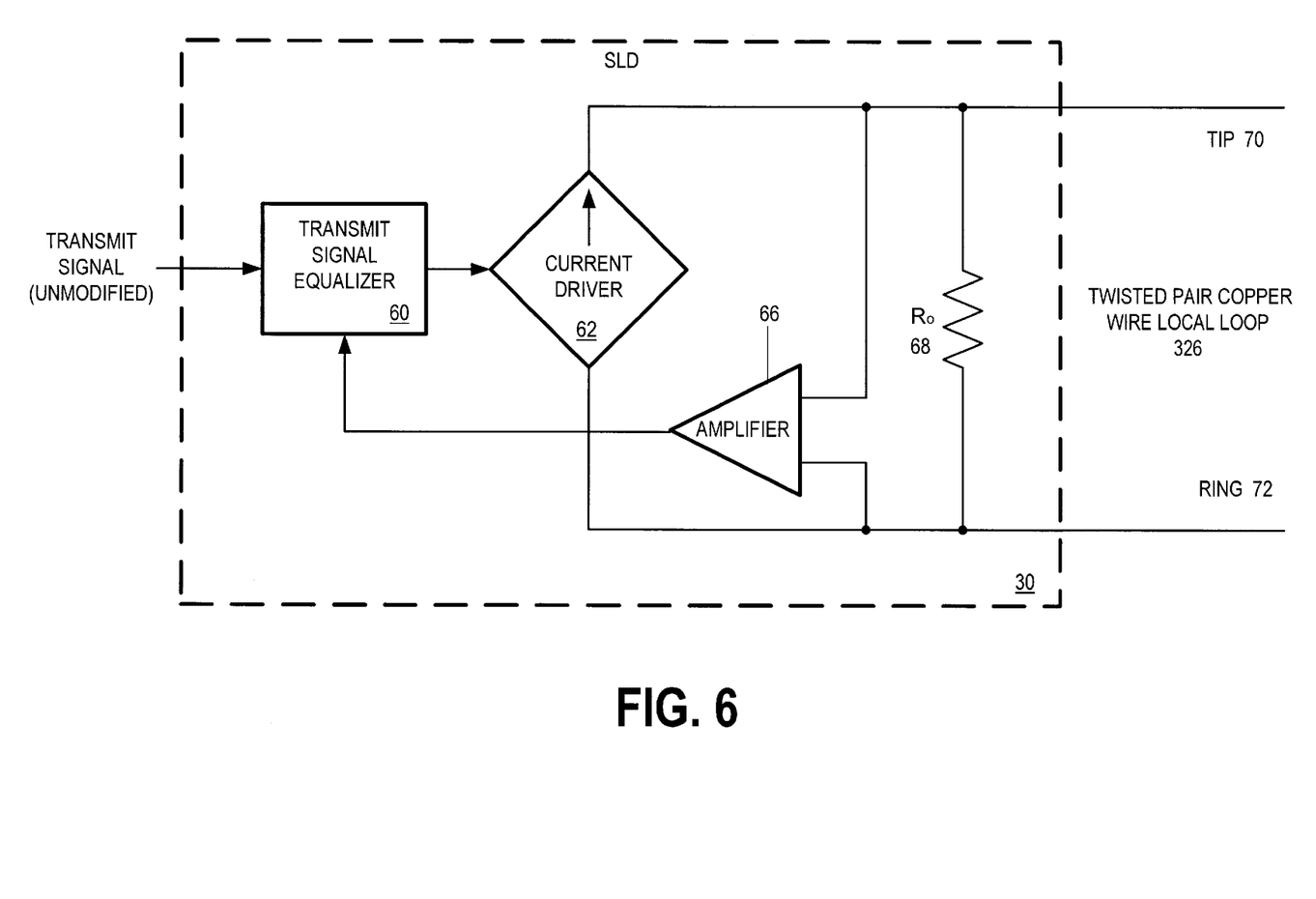
FIG. 6 is a block diagram illustrating electrical components of the SLD of FIG. 4; a transmit signal equalizer, a current driver, an amplifier and a parallel resister ($R_o$).

FIG. 6 shows two enhancements of the SLD 30 of FIG. 5A. The first enhancement is a voltage feedback loop wherein an amplifier 66 provides signal feedback to the transmit signal equalizer 60. The feedback loop detects a communication signal that may not be ideal (Channel B 138 of FIG. 3B) and provides for the continuous and automatic adjustment of the communication signal after the current driver 62 injects the transformed communication signal into the subscriber loop. The SLD 30 has the capability to provide a transformed communication signal PSD that is ideal regardless of the transmission channel impedance. Also, the SLD 30 has the capability to provide a transformed communication signal PSD that is ideal regardless of other multipoint transceivers. Once the SLD 30 transmit signal equalizer 60 has been calibrated for a particular DSL circuit, there is no need for continuing recalibration under practical applications. Here in FIG. 6, the subscriber loop is shown as a twisted pair copper wire local loop 326 of a telephony system or a DSL system consisting of a Tip 70 line and a Ring 72 line. The twisted pair copper wire local loop 326 is referenced in FIG. 1 as the telephony system subscriber loop 26 and in FIG. 4 as the DSL 226. As is well known by those skilled in the art, all of the above expressions describing telephony and DSL communication systems may be equivalent.

The second enhancement of the SLD 30 shown in FIG. 6 is the addition of a parallel resistor 68 of some finite impedance. The SLD 30 enjoys an infinite input impedance, often defined in the prior art as $R_R$. Note especially that with the SLD 30, an infinite input impedance $R_R$ is true for all frequencies. An infinite input impedance of the SLD 30 in the POTS band is desirable, as there would be no loading of the POTS band. And, although tradition of the prior art implies that for practical applications the terminating impedance of a transmission line should be assumed to be the "characteristic impedance" of the transmission line, one skilled in the art will realize that this is an incorrect conclusion based on "maximizing power transfer." In actuality, the ideal signal transmission optimization technique is to maximize the receive signal level as long as loss vs. frequency is within the tolerances of the receive signal equipment (can be read with acceptable bit error tolerances) and potential signal reflection on the transmission line is suitable. Although tradition of the existing prior art indicates the frequency band above 25 kHz should be terminated from 100 ohms to 135 ohms, empirical tests show that termination at 1000 ohms or higher, or even at an infinite impedance, would provide for superior voltage signal transmission. One skilled in the art will recognize that the simple addition of a parallel resister 68 shown in FIG. 6 can enable the design engineer to set the transmission system terminating impedance to any desired value without compromising the other attributes of the subscriber loop or the SLD 30.

Another benefit is provided by the infinite input impedance of the SLD 30. "Splitter-less" DSL technologies, well known in the art, require a subscriber loop transmission system with a relatively low $R_T$ and $R_R$ in the DSL frequency bands while having a relatively high $R_R$ in the POTS frequency band. For example, a desirable DSL transmission system $R_T$ and $R_R$ would be 100 ohms at 26 kHz and above, and for the POTS perhaps 1200 ohms at 4 kHz and below. This desirable DSL transmission system is very difficult, and perhaps impossible, to achieve with the prior art. The SLD 30 provides a way to implement specified impedances on a DSL system which provides for desirable impedances on both a POTS channel and splitter-less DSL channels. Also, the infinite input impedance of the SLD 30 minimizes the adverse affects of the POTS on-hook/off-hook transition on the DSL channel.

Yet another practical benefit from the SLD 30 is optimizing a DSL transmission system when two or more transceivers are placed at one or both ends of the subscriber loop, as in multipoint communication. The transmitted communication signal amplitude would, in the absence of the SLD 30, be significantly reduced due to the lowered net load impedance seen by that transmitter. For two transceivers, the transmitted communication signal could be reduced by as much as 4 dB. Similarly, the effective $R_R$ now becomes the parallel combination of the $R_R$ of the two transceivers, and the receive signal is reduced. Thus, the SLD provides for a transmitted communication signal which is not affected by the presence of multipoint operation, thereby optimizing the receive signal.

Figure 7A:
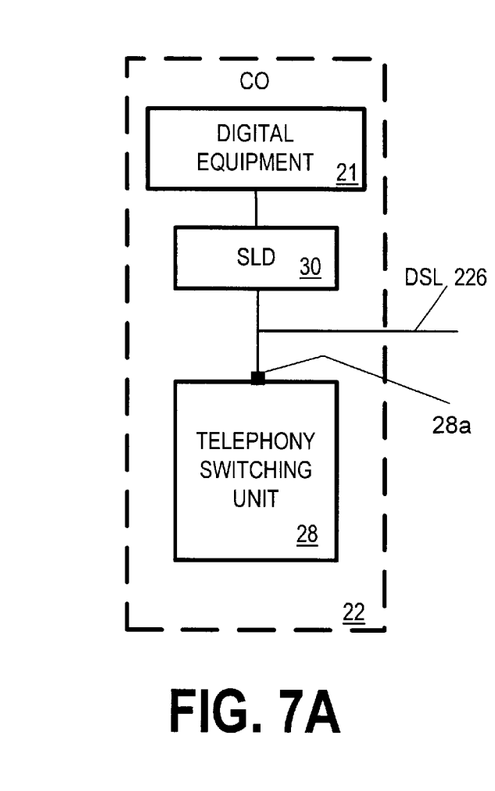
FIG. 7A is a block diagram illustrating a central office with a SLD located at the premises of the central office.
Figure 7B:
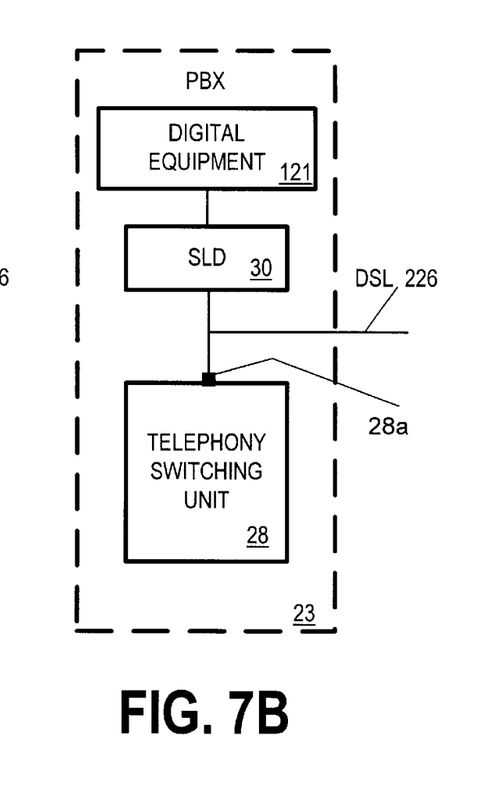
FIG. 7B is a block diagram illustrating a private branch exchange (PBX) with a SLD located at the premises of the PBX.

The inclusion of an SLD 30 into a larger system may be considered as an improvement to the larger system. When an SLD is incorporated into a CO 22, as shown in FIG. 7A, the CO 22 is improved in that the CO 22 may now transmit transformed communication signals from CO 22 digital equipment 21 which have been modified to conform to a predefined specification. Similarly, an SLD can be incorporated into a PBX 23 as an improvement, as shown in FIG. 7B. In both the CO 22 and the PBX 23, at least one SLD may be installed at the CO 22 or PBX 23, with one SLD 30 being ultimately located at some point between the digital equipment 21 or 121 and communication system transmission line, such as, but not limited to, a DSL 226.

Figure 8:
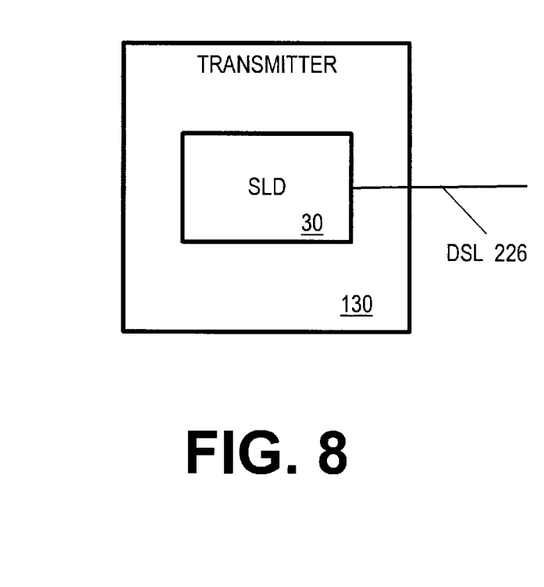
FIG. 8 is a diagram illustrating a transmitter with a SLD.

The SLD 30 may be considered as an improvement to a transmitter 130 system. The SLD 30, when incorporated into the transmitter 130, would transform communication signals to conform to a predefined specification. A transmitter 130 with an SLD 30 is shown in FIG. 8. The SLD 30 is ultimately connected to a communication system transmission line, such as, but not limited to, a DSL 226.

It should be emphasized that the above-described embodiments of the present invention, particularly, and "preferred"

embodiments or configurations, are merely possible examples of implementation, merely set forth for a clear understanding of the principles of the invention. Many variations and modifications may be made to the above-described embodiment(s) of the invention without departing substantially form the spirit and principles of the invention. All such modifications and variations are intended to be included herein within the scope of the present invention.

Now, therefore, at least the following is claimed:

1. A subscriber line driver (SLD) for transforming amplitude characteristics of a communication signal in a communication system pursuant to a predefined specification, comprising:

detecting means for detecting amplitude of said communication signal input into the SLD, said input communication signal having at least a first part and a second part, said first part having a first amplitude greater than the predefined specification, said second part having a second amplitude less than the predefined specification;

equalizing means for decreasing amplitude of said first part so that said first amplitude is in close proximity to the predefined specification, and for increasing amplitude of said second part so that said second amplitude is in close proximity to the predefined specification, thereby resulting in a transformed communication signal; and transmitting means for transmitting said transformed communication signal onto a communication medium.

2. The SLD of claim 1, wherein said predefined specification is a power spectral distribution (PSD) standard.

3. The SLD of claim 1, wherein said predefined specification is a fraction of a power spectral distribution (PSD) standard.

4. The SLD of claim 1, wherein said predefined specification includes a predefined frequency band, and further comprising a means for confining said signal to within said predefined frequency band.

5. The SLD of claim 4, wherein said means for confining includes a filter so that said filter attenuates a third part of said communication signal, wherein said third part lies outside of said predefined frequency band.

6. The SLD of claim 4, wherein said means for confining includes a frequency modulator so that said modulator translates a third part of said communication signal, wherein said third part lies outside of said predefined frequency band.

7. The SLD of claim 1, wherein the communication system is a telephony system.

8. The SLD of claim 1, wherein the communication system is a digital subscriber loop (DSL).

9. The SLD of claim 1, wherein the communication signal comprises analog information.

10. The SLD of claim 1, wherein the communication signal comprises digital information.

11. The SLD of claim 1, wherein said SLD generally exhibits an infinite input impedance.

12. The SLD of claim 11, wherein said input impedance further comprises a parallel resistor of a finite impedance connected to a tip wire and a ring wire of a telephony system.

13. The SLD of claim 1, wherein said equalizing means further comprises:

a signal equalizer; and a current driver, receiving communications from said signal equalizer, so that said current driver injects said transformed communication signal into the communication system.

14. The SLD of claim 1, wherein said equalizing means further comprises:

a signal equalizer; and a voltage driver, receiving communications from said signal equalizer, so that said voltage driver injects said transformed communication signal into the communication system.

15. The SLD of claim 13, further comprising a voltage feedback amplifier circuit wherein the inputs to the voltage feedback amplifier circuit are connected to a tip wire and a ring wire of a telephony system, and the output of the voltage feedback amplifier circuit is connected as an input to said signal equalizer.

16. The SLD of claim 14, further comprising a voltage feedback amplifier circuit wherein the inputs to the voltage feedback amplifier circuit are connected to tip wire and a ring wire of a telephony system, and the output of the voltage feedback amplifier circuit is connected as an input to said signal equalizer.

17. The SLD of claim 1, wherein the communication signal is continuously and automatically transformed by said SLD.

18. The SLD of claim 1, further comprising a means for sensing the direction of travel of said communication signal and a means for selectively operating in a transmit signal direction when the communication signal is traveling in a direction out to a communication transmission system.

19. The SLD of claim 1, wherein said equalizing means for decreasing said first part so that said first amplitude is within a predefined difference threshold to said predefined amplitude level and increasing said second part so that said second amplitude is within a predefined difference threshold to said predefined amplitude level.

20. A method for transforming characteristics of a communication signal, comprising the steps of:

detecting an amplitude of said communication signal input into a subscriber line driver (SLD) having a first part and a second part, said first part having a first amplitude greater than the predefined specification, said second part having a second amplitude less than the predefined specification;

equalizing said amplitude of said communication signal such that said first part is decreased so that said first amplitude is in close proximity to the predefined specification and said second part is increased so that said second amplitude is in close proximity to the predefined specification, thereby resulting in a transformed communication signal; and transmitting said transformed communication signal onto a communication system.

21. A subscriber line driver (SLD) for transforming characteristics of a communication signal in a communication system, comprising:

means for detecting amplitude of said communication signal received from a signal source;

means for comparing amplitude of said communication signal with a predefined specification amplitude;

means for selecting a communication signal component of said communication signal if said amplitude of said communication signal component is greater than said predefined specification amplitude;

means for attenuating amplitude of said communication signal component which is greater than said predefined specification amplitude, wherein attenuation of said communication signal component transforms said communication signal component into a processed communication signal component;

means for selecting a communication signal component of said communication signal if said amplitude of said communication signal component is less than said predefined specification amplitude;

means for amplifying amplitude of said communication signal component which is less than said predefined specification amplitude, wherein amplification of said communication signal component transforms said communication signal component into said processed communication signal component;

means for selecting a communication signal component of said communication signal if amplitude of said communication signal component equals said predefined specification amplitude, wherein said communication signal amplitude is not modified before transformation into said transformed communication signal component; and means for combining said processed communication signal components into a transformed communication signal, said transformed communication signal conforming to said predefined specification.

22. A method for transforming characteristics of a communication signal in a communication system, the method comprising the steps of:

detecting amplitude of said communication signal received from a signal source;

comparing amplitude of said communication signal with a predefined specification amplitude;

selecting a communication signal component of said communication signal if said amplitude of said communication signal component is greater than said predefined specification amplitude;

attenuating amplitude of said communication signal component which is greater than said predefined specification amplitude, wherein attenuation of said communication signal component transforms said communication signal component into a processed communication signal component;

selecting a communication signal component of said communication signal if said amplitude of said communication signal component is less than said predefined specification amplitude;

amplifying amplitude of said communication signal component which is less than said predefined specification amplitude, wherein amplification of said communication signal component transforms said communication signal component into said processed communication signal component;

selecting a communication signal component of said communication signal if amplitude of said communication signal component equals said predefined specification amplitude, wherein said communication signal amplitude is not modified before transformation into said transformed communication signal component; and combining said processed communication signal components into a transformed communication signal, said transformed communication signal conforming to said predefined specification.

23. A system for communicating a signal, comprising:

a subscriber line driver (SLD) configured to detect amplitude of an incoming communication signal into the SLD, configured to compare a plurality of portions of the incoming communication signal to a predefined specification, configured to transform each of the plurality of portions of the incoming communication signal to a value corresponding to the predefined specification thereby generating a transformed communication signal; and a current driver configured to receive the transformed communication signal and configured to communicate the transformed communication signal onto a communication system.

24. The system of claim 23, wherein said predefined specification is a power spectral distribution (PSD) standard.

25. The system of claim 23, wherein the communication system is a digital subscriber loop (DSL).

26. A system for communicating a signal, comprising:

a subscriber line driver (SLD) configured to detect amplitude of an incoming communication signal into the SLD, configured to compare each a plurality of portions of the incoming communication signal to a predefined specification, configured to transform each of the plurality of portions of the incoming communication signal to a value corresponding to the predefined specification thereby generating a transformed communication signal; and a voltage driver configured to receive the transformed communication signal and configured to communicate the transformed communication signal onto a communication system.

27. The system of claim 26, wherein said predefined specification is a power spectral distribution (PSD) standard.

28. The system of claim 26, wherein the communication system is a digital subscriber loop (DSL).

29. The system of claim 1, wherein the communication system comprises at least one selected from a group consisting of a digital subscriber loop (DSL) system, a public telephony system, a private branch exchange (PBXs), a coaxial cable system, a fiber optic system, a microwave system or a radio communication system.

30. The system of claim 20, wherein the communication system comprises at least one selected from a group consisting of a digital subscriber loop (DSL) system, a public telephony system, a private branch exchange (PBXs), a coaxial cable system, a fiber optic system, a microwave system or a radio communication system.

31. The system of claim 21, wherein the communication system comprises at least one selected from a group consisting of a digital subscriber loop (DSL) system, a public telephony system, a private branch exchange (PBXs), a coaxial cable system, a fiber optic system, a microwave system or a radio communication system.

32. The system of claim 22, wherein the communication system comprises at least one selected from a group consisting of a digital subscriber loop (DSL) system, a public telephony system, a private branch exchange (PBXs), a coaxial cable system, a fiber optic system, a microwave system or a radio communication system.

33. The system of claim 23, wherein the communication system comprises at least one selected from a group consisting of a digital subscriber loop (DSL) system, a public telephony system, a private branch exchange (PBXs), a coaxial cable system, a fiber optic system, a microwave system or a radio communication system.

34. The system of claim 23, wherein the communication system comprises at least one selected from a group consisting of a digital subscriber loop (DSL) system, a public telephony system, a private branch exchange (PBXs), a coaxial cable system, a fiber optic system, a microwave system or a radio communication system.

* * * * *

UNITED STATES PATENT AND TRADEMARK OFFICE
CERTIFICATE OF CORRECTION

PATENT NO. : 6,782,096 B1
DATED : August 24, 2004
INVENTOR(S) : Bremer et al.

It is certified that error appears in the above-identified patent and that said Letters Patent is hereby corrected as shown below:

Column 13,
Line 6, after the word "substantially", delete the word "form", and substitute therefor -- from --.

Column 16,
Line 16, after the word "each", add the word -- of --.

Signed and Sealed this

Twelfth Day of October, 2004

JON W. DUDAS
*Director of the United States Patent and Trademark Office*

UNITED STATES PATENT AND TRADEMARK OFFICE
CERTIFICATE OF CORRECTION

PATENT NO. : 6,782,096 B1  Page 1 of 1
APPLICATION NO. : 09/439933
DATED : August 24, 2004
INVENTOR(S) : Bremer et al.

It is certified that error appears in the above-identified patent and that said Letters Patent is hereby corrected as shown below:

At Sheet 9 of 9, delete FIGS. 7A and 7B and replace with:

At column 6, line 50, delete "(SLD) at the transmit signal site." and replace with --(SLD) 30 at the transmit signal site 122.--.

At column 6, line 52, delete "amplitude spectra 238," and replace with --amplitude spectra 238 (FIG. 3C),--.

At column 6, lines 60, delete "receive signal equipment 129." and replace with --receive signal equipment 129 at the receiving site 124.--.

Signed and Sealed this

Thirtieth Day of November, 2010

David J. Kappos
Director of the United States Patent and Trademark Office